US011383262B2

(12) United States Patent
Dafonseca et al.

(10) Patent No.: US 11,383,262 B2
(45) Date of Patent: Jul. 12, 2022

(54) SPRINKLER ASSEMBLY CONNECTOR FOR FLEXIBLE CONDUIT

(71) Applicant: ASC Engineered Solutions, LLC, Exeter, NH (US)

(72) Inventors: Odair Dafonseca, Pawtucket, RI (US); Joseph Beagen, Providence, RI (US)

(73) Assignee: ASC Engineered Solutions, LLC, Exeter, NH (US)

( * ) Notice: Subject to any disclaimer, the term of this patent is extended or adjusted under 35 U.S.C. 154(b) by 86 days.

(21) Appl. No.: 16/355,223

(22) Filed: Mar. 15, 2019

(65) Prior Publication Data

US 2019/0262853 A1 Aug. 29, 2019

Related U.S. Application Data

(63) Continuation of application No. 15/290,144, filed on Oct. 11, 2016, now Pat. No. 10,279,367.

(51) Int. Cl.
| | |
|---|---|
| *B05B 15/658* | (2018.01) |
| *A62C 35/62* | (2006.01) |
| *A62C 35/68* | (2006.01) |
| *B05B 15/62* | (2018.01) |
| *A62C 35/64* | (2006.01) |
| *F16L 3/10* | (2006.01) |
| *A62C 3/00* | (2006.01) |

(52) U.S. Cl.
CPC ............ *B05B 15/658* (2018.02); *A62C 3/004* (2013.01); *A62C 35/62* (2013.01); *A62C 35/645* (2013.01); *A62C 35/68* (2013.01); *B05B 15/62* (2018.02); *F16L 3/1075* (2013.01)

(58) Field of Classification Search
CPC ......... A62C 3/004; A62C 35/62; A62C 35/68; A62C 35/645; B05B 15/62; B05B 15/658; F16L 3/1075; F16L 3/24
USPC ........ 169/16, 17, 37, 41; 239/208, 209, 588, 239/600; 285/133.11, 288.1–288.11
See application file for complete search history.

(56) References Cited

U.S. PATENT DOCUMENTS

| | | | | |
|---|---|---|---|---|
| 2,017,841 | A | | 10/1935 | Coleman |
| 2,695,183 | A | * | 11/1954 | Andrew ................. F16L 33/26 285/334.1 |
| 3,298,388 | A | * | 1/1967 | Purtell ................... A01G 25/00 137/382 |

(Continued)

OTHER PUBLICATIONS

Dafonseca, Odair; Final Office Action for U.S. Appl. No. 15/290,144, filed Oct. 11, 2016, dated Oct. 3, 2018, 9 pgs.

(Continued)

*Primary Examiner* — Steven J Ganey
(74) *Attorney, Agent, or Firm* — Taylor English Duma LLP (57) ABSTRACT

A connector includes a first member defining a first opening; a second member defining a second opening; and a third member defining a third opening, the first opening, the second opening, and the third opening being centrally connected to define a cavity within the connector. A method for draining a sprinkler assembly includes removing a plug from a third opening of a connector of the sprinkler assembly, a sprinkler body of the sprinkler assembly connected to a first opening of the connector, a flexible conduit of the sprinkler assembly connected to a second opening of the connector; and draining a fluid from the connector and the flexible conduit through the third opening.

8 Claims, 6 Drawing Sheets

(56) References Cited

U.S. PATENT DOCUMENTS

| | | | |
|---|---|---|---|
| 4,844,322 A * | 7/1989 | Flowers | F16L 55/1608 |
| | | | 285/288.11 |
| 6,158,519 A | 12/2000 | Kretschmer | |
| 6,241,024 B1 | 6/2001 | Haase, III | |
| 9,345,918 B2 | 5/2016 | Bucher | |
| 9,511,248 B2 | 12/2016 | Szentimrey | |
| 10,279,367 B2 | 5/2019 | Dafonseca et al. | |
| 2004/0026533 A1 * | 2/2004 | MacDonald, III | A62C 35/68 |
| | | | 239/209 |
| 2011/0215566 A1 | 9/2011 | Stempo et al. | |
| 2013/0257580 A1 * | 10/2013 | Gilman | H01H 1/5866 |
| | | | 337/248 |
| 2015/0122513 A1 | 5/2015 | Miller | |
| 2018/0099167 A1 | 4/2018 | Dafoneseca et al. | |

OTHER PUBLICATIONS

Dafonseca, Odair; Issue Notification for U.S. Appl. No. 15/290,144, filed Oct. 11, 2016, dated Apr. 17, 2019, 1 pg.
Dafonseca, Odair; Non-Final Office Action for U.S. Appl. No. 15/290,144, filed Oct. 11, 2016, dated Mar. 9, 2018, 7 pgs.
Dafonseca, Odair; Notice of Allowance for U.S. Appl. No. 15/290,144, filed Oct. 11, 2016, dated Jan. 3, 2019, 5 pgs.

* cited by examiner

SPRINKLER ASSEMBLY CONNECTOR FOR FLEXIBLE CONDUIT

REFERENCE TO RELATED APPLICATION

This application is a continuation of U.S. application Ser. No. 15/290,144, filed Oct. 11, 2016, which is hereby specifically incorporated by reference herein in its entirety.

BACKGROUND OF THE DISCLOSURE

Field of the Disclosure

The present disclosure relates to sprinkler assemblies and, more particularly, to a fire protection sprinkler system including a flexible conduit secured at t-joint connector.

Discussion of Related Art

Conventional automatic fire sprinkler systems include a network of pipes that carry a fire suppressant (e.g., a fluid) to one or more rooms in a building. Conduit sections carry the fluid from the pipes to sprinkler heads strategically located in different rooms. The position and orientation of each sprinkler head is typically maintained in place by a support assembly. When the room reaches an elevated temperature due to a fire, the sprinkler head is activated allowing a stream of fire suppression fluid to be directed over the intended area of coverage.

In certain applications or environments with temperatures below freezing, dry-type sprinklers may be used. The dry-type sprinklers can be installed in either an upright, sidewall, or a pendent position, according to design. Generally speaking, dry pipe sprinklers comprise a sprinkler adapted to be installed in a piping system, the sprinkler having a valve at the inlet end to prevent water or other fire extinguishing fluid in the pipeline from entering the sprinkler until the sprinkler is put into operation by collapse of a thermally responsive mechanism. The valve end of the sprinkler is screwed into or otherwise attached to a fitting in the water supply piping.

In many warehouse coolers and freezers, the compartment that is controlled at a cool or freezing temperature is a box enclosure within a heated warehouse or building compartment. However, current dry pipe sprinkler technology used in cooler/freezer applications include extended pipe lengths, which may be problematic given the limited space available in typical ceiling grids of coolers and freezers.

SUMMARY OF THE DISCLOSURE

In view of the foregoing, there is a need in the art for a dry-type sprinkler assembly employing a more compact design to alleviate the problems of conventional systems. Provided herein is a sprinkler system including flexible hosing and a compact-design connector that satisfies applicable fire codes and standards, and that reduces the overall footprint of the sprinkler assembly, thus enabling use in a freezer/cooler application. In aspect, a connector can comprise a first member defining a first opening; a second member defining a second opening; and a third member defining a third opening, the first opening, the second opening, and the third opening being centrally connected to define a cavity within the connector.

In another aspect, a method for draining a sprinkler assembly can comprise removing a plug from a third opening of a connector of the sprinkler assembly, a sprinkler body of the sprinkler assembly connected to a first opening of the connector, a flexible conduit of the sprinkler assembly connected to a second opening of the connector; and draining a fluid from the connector and the flexible conduit through the third opening.

BRIEF DESCRIPTION OF THE DRAWINGS

The accompanying drawings illustrate exemplary approaches of the disclosure, including the practical application of the principles thereof, and in which.

The drawings are not necessarily to scale. The drawings are merely representations, not intended to portray specific parameters of the disclosure. Furthermore, the drawings are intended to depict exemplary embodiments of the disclosure, and therefore is not considered as limiting in scope.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DESCRIPTION OF EMBODIMENTS

The present disclosure will now proceed with reference to the accompanying drawings, in which various approaches are shown. It will be appreciated, however, that the disclosed torch handle may be embodied in many different forms and should not be construed as limited to the approaches set forth herein. Rather, these approaches are provided so that this disclosure will be thorough and complete, and will fully convey the scope of the disclosure to those skilled in the art. In the drawings, like numbers refer to like elements throughout.

As used herein, an element or operation recited in the singular and proceeded with the word "a" or "an" should be understood as not excluding plural elements or operations, unless such exclusion is explicitly recited. Furthermore, references to "one approach" of the present disclosure are not intended to be interpreted as excluding the existence of additional approaches that also incorporate the recited features.

Furthermore, spatially relative terms, such as "beneath," "below," "lower," "central," "above," "upper," and the like, may be used herein for ease of describing one element's relationship to another element(s) as illustrated in the figures. It will be understood that the spatially relative terms may encompass different orientations of the device in use or operation in addition to the orientation depicted in the figures.

As stated above, provided herein is a sprinkler system including a compact-design connector for securing a flexible conduit to a sprinkler body. In one approach a sprinkler assembly includes a t-joint connector (i.e., t-shaped attachment device), a sprinkler body (e.g., a dry-type pendent) coupled to the t-joint connector at a first opening of the t-joint connector, and a flexible conduit coupled to the t-joint connector at a second opening of the t-joint coupling. The sprinkler assembly may further include an adjustable bracket coupling the sprinkler body to a structure such as a ceiling or wall. The flexible conduit and t-joint connector satisfy applicable fire codes and standards, and reduce the overall footprint of the sprinkler assembly, thus enabling use in a freezer/cooler application.

Figure 1:
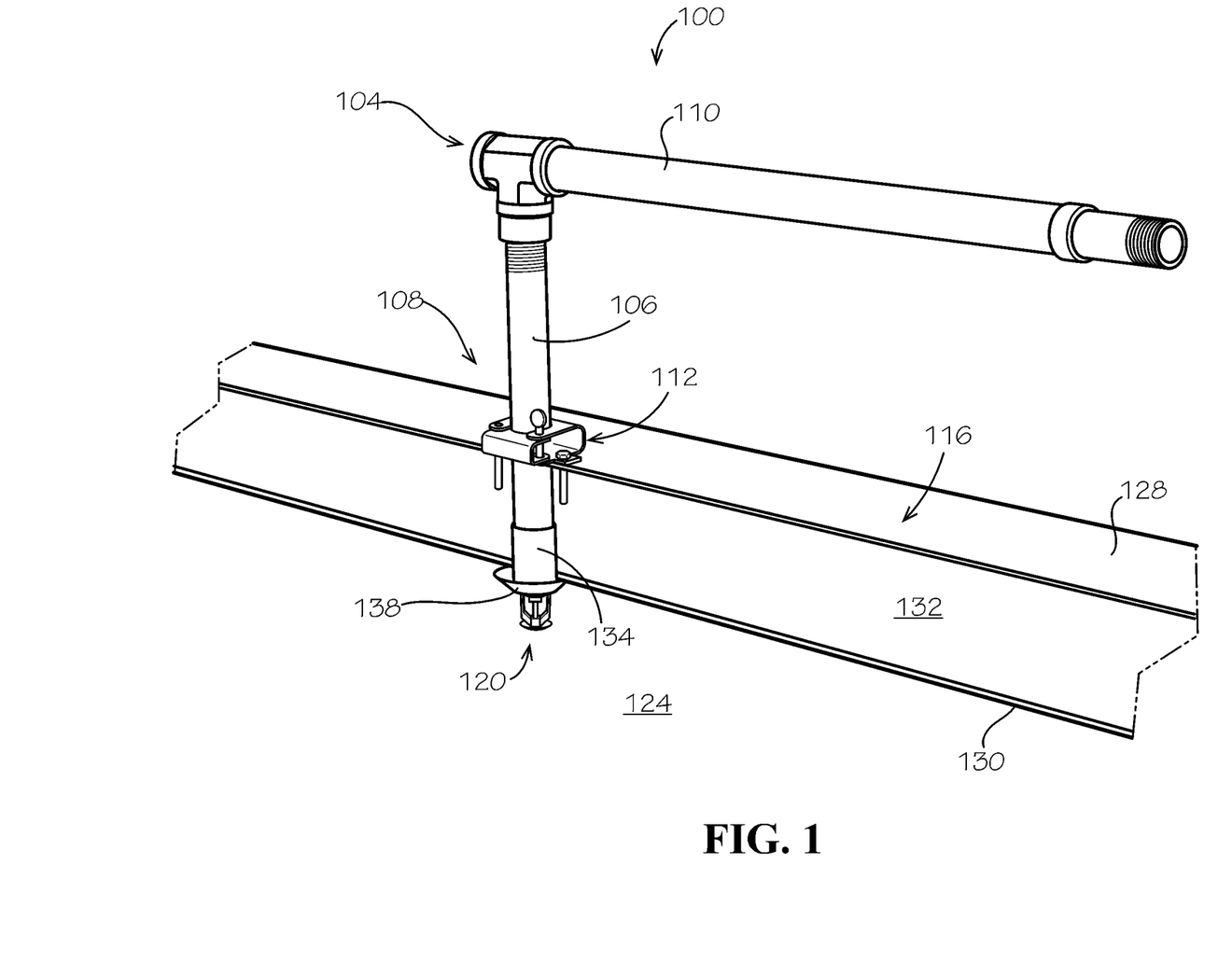
FIG. 1 is an isometric view of a sprinkler assembly according to exemplary approaches of the disclosure.
Figure 2:
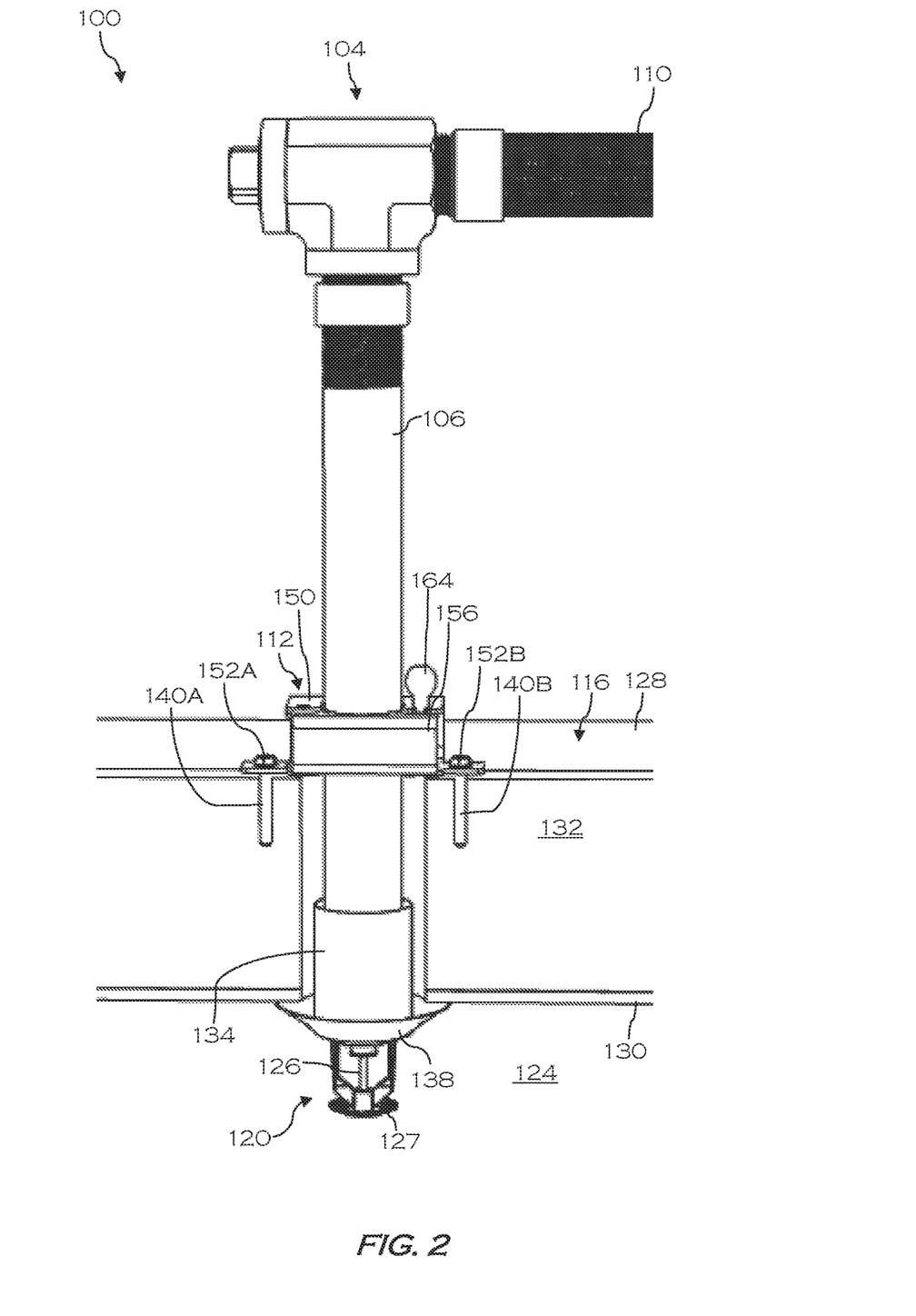
FIG. 2 is a side view of the sprinkler assembly of FIG. 1 according to exemplary approaches of the disclosure.

Referring now to FIGS. 1-2, a sprinkler assembly/system, which may be a dry-type fire suppression sprinkler assembly, will be described in greater detail according to exemplary embodiments of the disclosure. As shown, the sprinkler assembly 100 may include a t-joint connector (hereinafter "connector") 104, joining together a sprinkler body 106 with a flexible conduit 110. The sprinkler assembly 100 may further include an adjustable bracket 112 coupling the sprinkler body 106 to a ceiling 116, which is shown partially cutaway for ease of viewing. A thermally responsive sprinkler head 120 extends downward from the sprinkler body 106, through an opening 122 in the ceiling 116, and into an environment 124 to be protected, which may be a cooler or freezer. In other embodiments, the sprinkler head 120 may be formed through a wall instead of through the ceiling.

In some embodiments, the sprinkler body 106 may be a dry-type pendent sprinkler body that acts as a conduit for a fire suppressant. In the event of a fire, a thermally responsive device 126 of the sprinkler head 120 reacts to heat generated by the fire to allow fluid to flow through the sprinkler body 106 and into a deflector 127, where the fluid is dispersed outwardly to extinguish the fire. Although a fluid commonly used in such dry sprinklers is water, other fire retardant fluids including nitrogen and halogen, may also be used in various embodiments.

As shown, the sprinkler body 106 is positioned to extend through the opening 122 in the ceiling 116. In the case that the environment 124 is a freezer, the ceiling 116 may include an outer wall 128 (e.g., a metal plate), an inner wall 130, and a layer of insulation 132 disposed between the inner and outer walls 130, 128. The sprinkler body 106 is positioned through the opening 122 such that the sprinkler head 120 is positioned within cold environment 124. In some embodiments, the sprinkler body 106 may include a sleeve 134 disposed along a lower portion thereof, and an escutcheon 138 surrounding the sprinkler head 120. As shown, a lower portion of the sleeve 134 extends from the opening 122 and is engaged by the escutcheon 138.

Figure 3A:
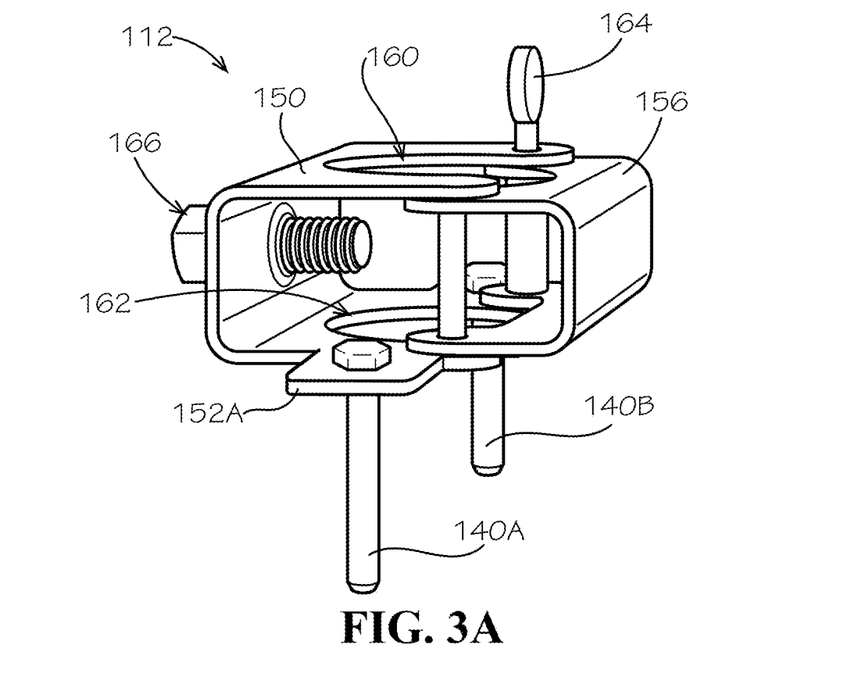
FIG. 3A is an isometric view of an adjustable bracket of the sprinkler assembly of FIG. 1 according to exemplary approaches of the disclosure.
Figure 3B:
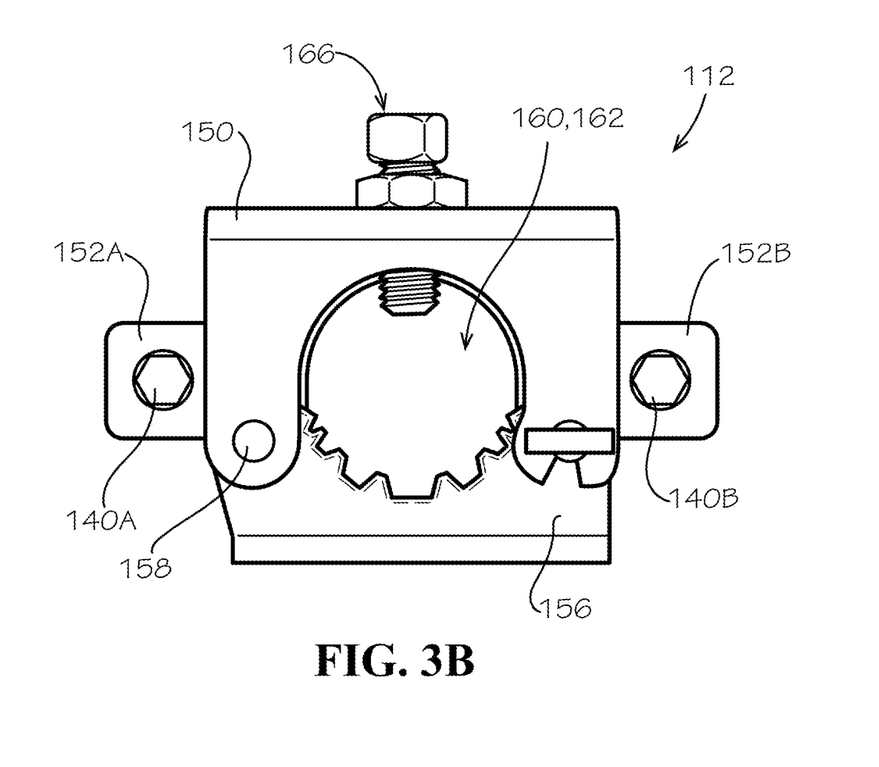
FIG. 3B is a top view of the adjustable bracket of FIG. 3A according to exemplary approaches of the disclosure.

In exemplary embodiments, the sprinkler body 106 is secured to the ceiling 116 by the adjustable bracket 112 using, for example, a set of fasteners 140A-B extending through the outer wall 130 and into the layer of insulation 132. As shown in FIGS. 2-3B, the adjustable bracket 112 may be a hub assembly including a primary support 150 including a set of laterally extending tabs 152A-B, which mount to the outer wall 130 via the set of fasteners 140A-B, and a secondary support 156 that is rotatably connected to the primary support 150. The secondary support 156 rotates relative to the primary support 150 about a pin 158 between an open position (not shown) and a closed position (shown). The primary support 150 and secondary support 156 are each formed having cut out portions 160, 162, so that when the secondary support 156 is in the closed position relative to the primary support 150, the cut out 160 formed in the primary support 150 cooperates with the cut out 162 formed in the secondary support 156 to define a hub opening configured to receive and securely retain the sprinkler body 106 therein. When the adjustable bracket 112 is secured to the ceiling 116, the hub opening coincides with the opening 122 through the ceiling 116. In addition, the adjustable bracket 112 includes a locking mechanism 164 that selectively connects the primary support 150 to the secondary support 156, and an adjustment mechanism 166 (e.g., a set screw) provided on the primary support 150 is used to secure the position of the sprinkler body 106 within the hub opening.

Turning now to FIGS. 4-7B, the connector 104 according to exemplary embodiments will be described in greater detail. As shown, the connector 104 is a right-angled joint, making the shape of the letter 'T' with three (3) openings 170, 171, and 172 formed therein. The openings 170, 171, and 172 extend towards each other, centrally connecting to form a cavity 174 within the connector 104. In exemplary embodiments, the sprinkler body 106 is secured to the connector 104 at the first opening 170, the flexible conduit 110 is secured to the connector 104 at the second opening 171, and a plug 175 is secured to the connector 104 at the third opening 172. As configured, the sprinkler body 106 and the flexible conduit 110 are oriented perpendicular, or substantially perpendicular, to one another.

Figure 4:
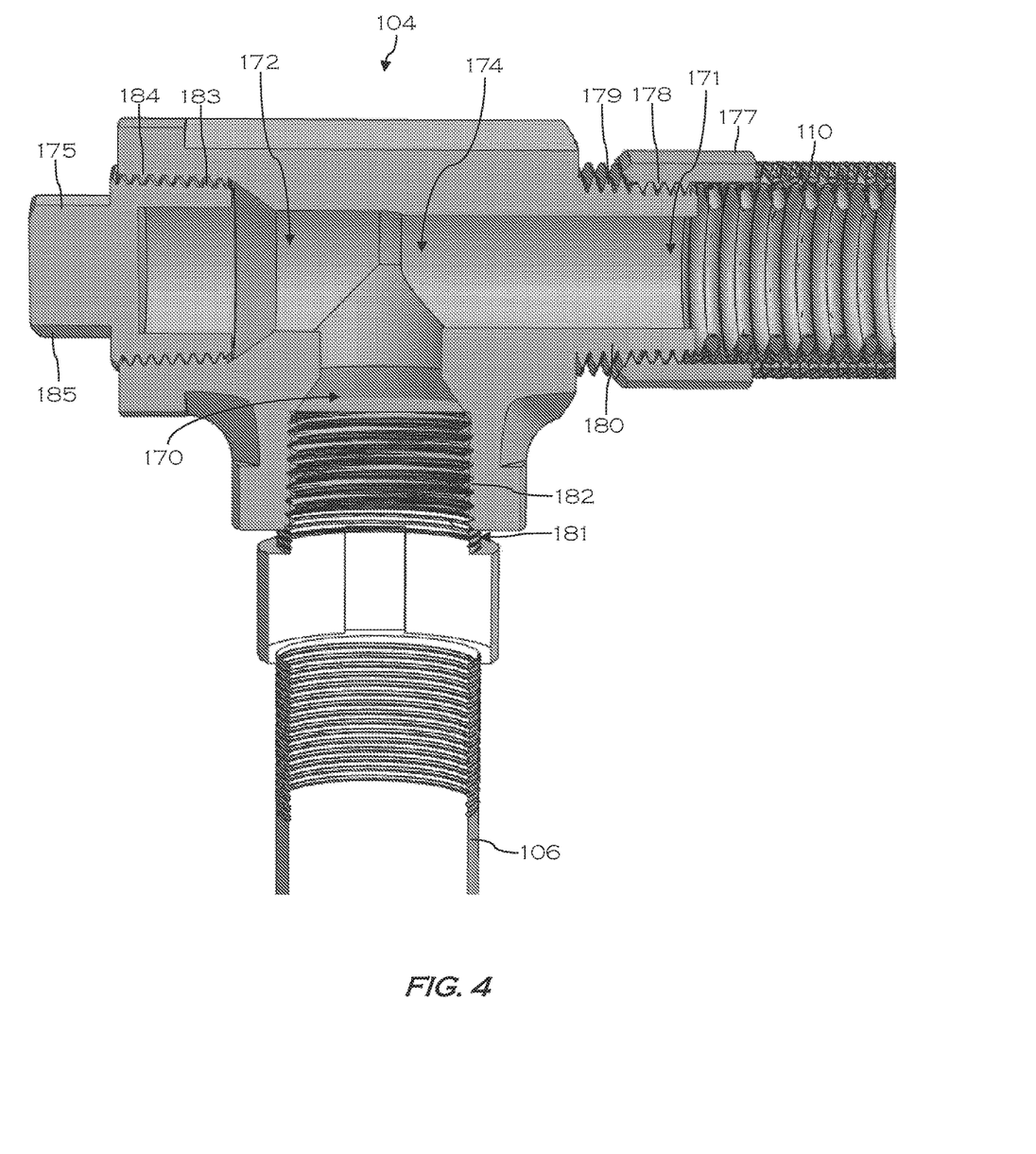
FIG. 4 is a side cutaway view of a t-joint connector of the sprinkler assembly of FIG. 1 according to exemplary approaches of the disclosure.
Figure 5:
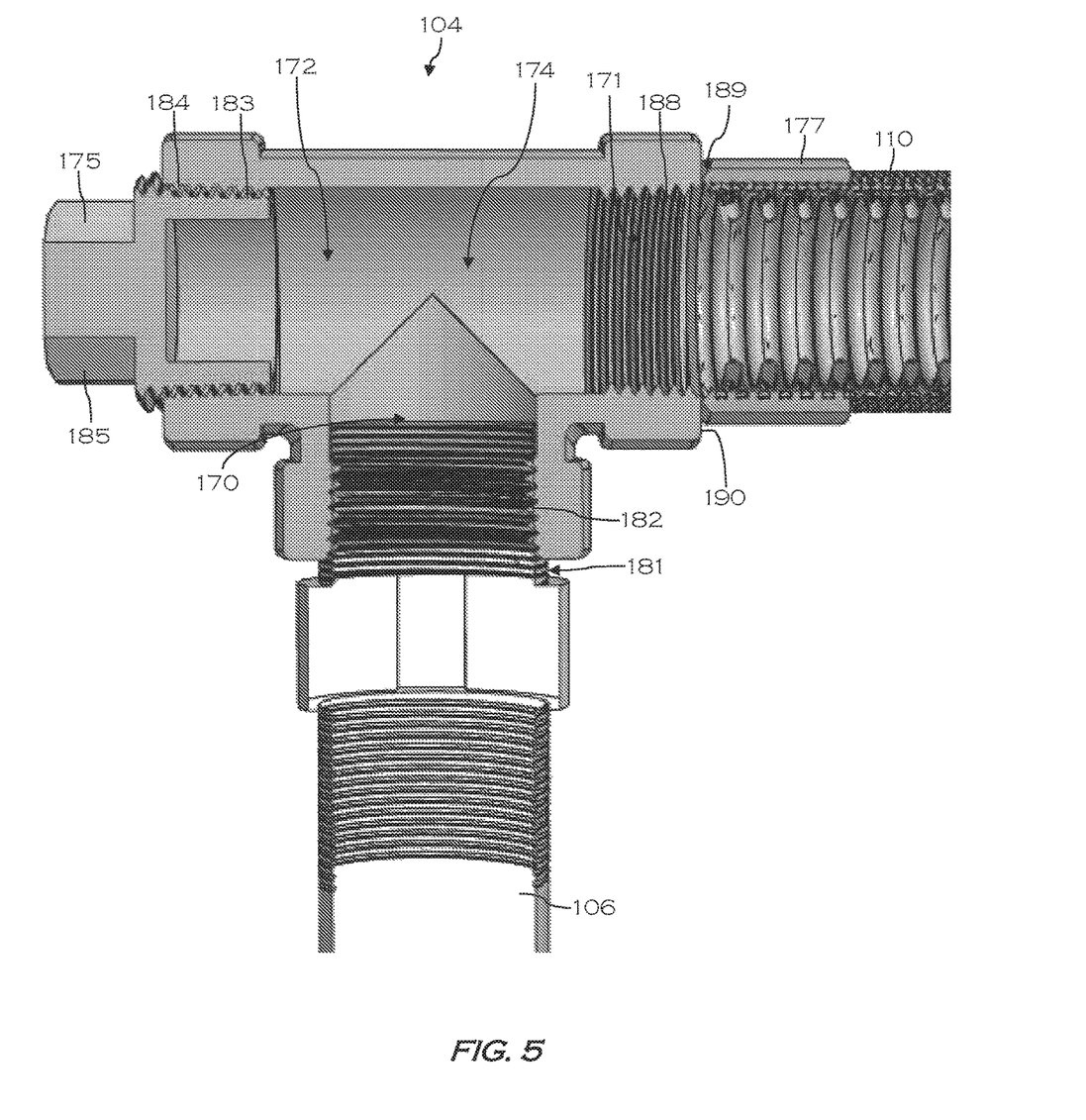
FIG. 5 is a side cutaway view of a t-joint connector of the sprinkler assembly of FIG. 1 according to exemplary approaches of the disclosure.
Figure 6:
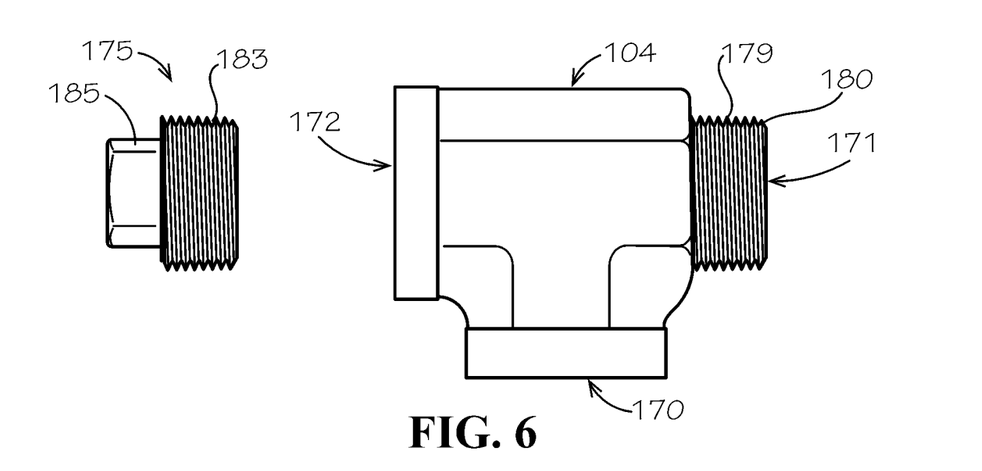
FIG. 6 is an exploded side view of a t-joint connector of the sprinkler assembly of FIG. 1 according to exemplary approaches of the disclosure.
Figure 7A:
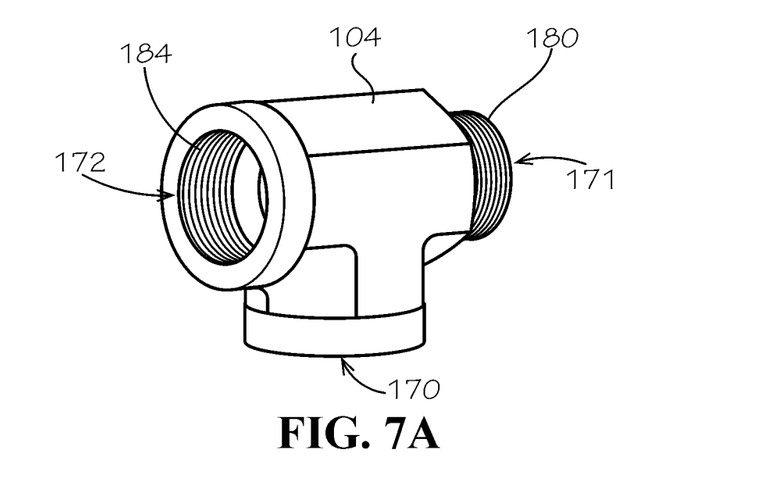
FIG. 7A is an isometric view of the t-joint connector of the sprinkler assembly of FIG. 1 according to exemplary approaches of the disclosure.
Figure 7B:
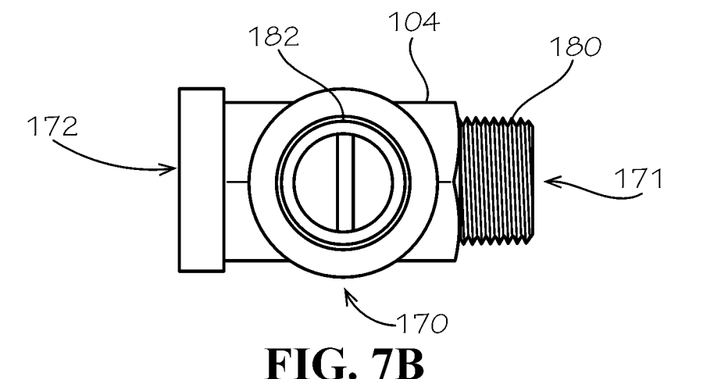
FIG. 7B is a bottom view of the tip adaptor of FIG. 7A according to exemplary approaches of the disclosure.

As shown, the flexible conduit 110 is threadably secured about the second opening 171 of the connector 104. Specifically, a fitting or mounting cuff 177 of the flexible conduit 110 includes internal threading 178 configured to mate with external threading 179 of a male member 180 defining the second opening 171 of the connector 104. In other embodiments, the second opening 171 may include internal threading, and the mounting cuff 177 and/or the flexible conduit 110 may include external threading. For example, in the embodiment shown in FIG. 5, no male member is present. Instead, the second opening 171 includes internal threading 188 for engaging corresponding threading (not shown) of the mounting cuff 177 and/or the flexible conduit 110 within the second opening 171. Alternatively, in some embodiments, the mounting cuff 177 and/or the flexible conduit 110 are welded to the connector 104. For example, in the embodiment shown in FIG. 5, one end 189 of the mounting cuff 177 may be directly welded to an exterior surface 190 of the connector 104 surrounding the second opening 171.

The flexible conduit 110 may include a flexible portion that comprises, for example, a corrugated tube, a hose, or a braided tube, which can be made from known materials including metal, rubber, etc. In an exemplary embodiment, the flexible conduit 110 is corrugated metal with a braided metal covering, which is joined to the mounting cuff 177 by welding or screw connectors. The flexible conduit 110 may be flexible along its entire length, or may include one or more flexible portions adjacent more rigid portions. In one non-limiting embodiment, the flexible conduit 110 may have a low elasticity so that when bent into a desired position, the flexible conduit 110 it maintains its shape and does not return to its original position.

As further shown, the sprinkler body 106 and the plug 175 are threadably secured within the first opening 170 and the third opening 172, respectively. Specifically, the sprinkler body 106 includes external threading 181 configured to mate with corresponding internal threading 182 provided along an interior surface of the connector 104 defining the first opening 170, while the plug 175 includes external threading 183 configured to mate with corresponding internal threading 184 provided along an interior surface of the connector 104 defining the third opening 172. In some embodiments, the plug 175 is provided to drain water from the sprinkler assembly 100. As such, the plug 175 may include a tab or squared protrusion 185 to allow easy removal either by hand or with the aid of a tool.

During assembly and installation, the flexible conduit 110 may be threaded into the connector 104, and then the plug 175 may be threaded into the opposite side of the connector, e.g., at third opening 172. The dry-type pendent sprinkler body 106 is threaded into the connector 104, e.g., within opening 170, and then anchored to a metal panel system of the ceiling 116 with the open hub bracket 112 and fasteners 140A-B. A user may adjust the height of the connector 104 by installing the smallest size pendent length for a given metal panel ceiling thickness.

One will appreciate that at least the following advantages are achieved by the embodiments of the present disclosure. Firstly, use of the t-shaped connector satisfies certain fire code standards that prohibit use of an elbow connection to a flexible metal hose in freezer/cooler applications. Secondly, the t-shaped connector allows height to be reduce where ceiling height space is limited.

While the present disclosure has been described with reference to certain approaches, numerous modifications, alterations and changes to the described approaches are possible without departing from the sphere and scope of the present disclosure, as defined in the appended claims. Accordingly, it is intended that the present disclosure not be limited to the described approaches, but that it has the full scope defined by the language of the following claims, and equivalents thereof. While the disclosure has been described with reference to certain approaches, numerous modifications, alterations and changes to the described approaches are possible without departing from the spirit and scope of the disclosure, as defined in the appended claims. Accordingly, it is intended that the present disclosure not be limited to the described approaches, but that it has the full scope defined by the language of the following claims, and equivalents thereof.

What is claimed is:

1. A connector comprising:
a first member defining a first opening, the first opening defining internal threading, the first opening receiving an elongated sprinkler body of a sprinkler assembly, a sprinkler head of the sprinkler assembly coupled to the elongated sprinkler body opposite from the first member;
a second member defining a second opening, the second member defining external threading;
a mounting cuff attached to the second member, the mounting cuff defining internal threading, the mounting cuff coupled to a flexible conduit; and
a third member defining a third opening, the first opening, the second opening, and the third opening being centrally connected to define a cavity within the connector, the second opening tapering inwards towards the cavity, the third opening positioned opposite from the second opening, the first opening positioned perpendicular to the second opening and the third opening, the third opening defining internal threading, the third opening sealed with a plug.

2. The connector of claim 1, wherein the plug defines external threading, and wherein the plug threadedly engages the third opening.

3. The connector of claim 1, wherein:
the sprinkler body extends through a wall;
the wall is positioned between the connector and the sprinkler head; and
a clamp of the sprinkler assembly secures the sprinkler body to the wall.

4. The connector of claim 3, wherein the sprinkler assembly further comprises a sleeve and an escutcheon plate positioned around the sprinkler body, and the escutcheon plate is positioned between the sprinkler head and the wall.

5. A method for draining a sprinkler assembly comprising:
removing a plug from a third opening of a connector of the sprinkler assembly, the third opening defining internal threading, the plug threadedly engaging the internal threading, a sprinkler body of the sprinkler assembly connected to a first opening of the connector, the first opening defining internal threading, the first opening positioned perpendicular to the third opening, a flexible conduit of the sprinkler assembly connected to a second opening of the connector by a mounting cuff, the second opening defined opposite from the third opening, the second opening defined by a member of the connector, the mounting cuff attached to external threading of the member, the mounting cuff defining internal threading, the mounting cuff coupled to a flexible conduit, the first opening, the second opening, and the third opening being centrally connected to define a cavity within the connector, the second opening tapering inwards towards the cavity; and
draining a fluid from the connector and the flexible conduit through the third opening.

6. The method of claim 5, wherein the fluid is a liquid.

7. The method of claim 5, wherein the fluid is water.

8. A connector comprising:
a first member defining a first opening;
an elongated sprinkler body of a sprinkler assembly connected to the first opening, the sprinkler assembly comprising a sprinkler head coupled to the sprinkler body opposite from the connector, the sprinkler body extending through a wall, the wall positioned between the connector and the sprinkler head;
a second member defining a second opening, the second member positioned perpendicular to the first member; and
a mounting cuff of a flexible conduit coupled to the second member; and
a third member defining a third opening, the first opening, the second opening, and the third opening being centrally connected to define a cavity within the connector, the third opening defined opposite from the second opening, the third opening sealed by a plug, the third opening tapering inwards towards the cavity.

* * * * *